(12) United States Patent
Young, III

(10) Patent No.: US 11,241,843 B2
(45) Date of Patent: Feb. 8, 2022

(54) ANIMAL TOY AND METHOD OF MANUFACTURE

(71) Applicant: Walter Michael Young, III, Hatfield, PA (US)

(72) Inventor: Walter Michael Young, III, Hatfield, PA (US)

( * ) Notice: Subject to any disclaimer, the term of this patent is extended or adjusted under 35 U.S.C. 154(b) by 192 days.

(21) Appl. No.: 16/316,001

(22) PCT Filed: Jul. 18, 2017

(86) PCT No.: PCT/US2017/042581
§ 371 (c)(1),
(2) Date: Jan. 7, 2019

(87) PCT Pub. No.: WO2018/017564
PCT Pub. Date: Jan. 25, 2018

(65) Prior Publication Data
US 2019/0240925 A1    Aug. 8, 2019

Related U.S. Application Data

(63) Continuation of application No. 29/571,698, filed on Jul. 20, 2016, now abandoned.
(Continued)

(51) Int. Cl.
*B29C 67/24* (2006.01)
*A01K 15/02* (2006.01)
(Continued)

(52) U.S. Cl.
CPC ............ *B29C 67/24* (2013.01); *A01K 15/026* (2013.01); *B29C 35/02* (2013.01);
(Continued)

(58) Field of Classification Search
CPC ..... B29C 67/24; B29C 71/0009; B29C 35/02; B29C 2071/0045; C08L 7/02; C08L 7/00;
(Continued)

(56) References Cited

U.S. PATENT DOCUMENTS 2,328,769 A * 9/1943 Auzin ............... B29C 41/14
425/269
2,340,243 A * 1/1944 Beal .................. B29C 41/24
264/165
(Continued)

OTHER PUBLICATIONS

McGill Publications, Try this at home: Make your own polymer bouncy balls: Science Alumni Corner, Sep. 27, 2014, McGill, pp. 1-3 (Year: 2014).*

*Primary Examiner* — Jeffrey M Wollschlager
(74) *Attorney, Agent, or Firm* — Gugliotta & Gugliotta LPA

(57) ABSTRACT

An animal toy is provided constructed from a latex or natural rubber material and formed into a ball. The ball is formed of an aggregate of particulate material that are bound together to form a substantially non-hollow construction. Pieces of latex are joined together to form balls, and the balls may be pressed together and constructed by hand or, alternatively, pressed into molds. By constructing the balls by hand, no two balls, even balls of similar size, are identical. Each ball has irregular outer surface that forms a variety of resilient protuberances that provide beneficial oral hygiene effects when chewed or rubbed against the teeth.

11 Claims, 9 Drawing Sheets

Related U.S. Application Data

(60) Provisional application No. 62/364,114, filed on Jul. 19, 2016.

(51) Int. Cl.

| | | |
|---|---|---|
| *B29C 35/02* | (2006.01) | |
| *C08L 21/02* | (2006.01) | |
| *C08L 7/02* | (2006.01) | |
| *B29C 71/00* | (2006.01) | |
| *C08C 1/15* | (2006.01) | |
| *C08L 7/00* | (2006.01) | |
| *B29K 7/00* | (2006.01) | |
| *B29K 105/00* | (2006.01) | |
| *B29L 31/52* | (2006.01) | |

(52) U.S. Cl.
CPC ............ *B29C 71/0009* (2013.01); *C08C 1/15* (2013.01); *C08L 7/00* (2013.01); *C08L 7/02* (2013.01); *C08L 21/02* (2013.01); *B29C 2071/0045* (2013.01); *B29K 2007/00* (2013.01); *B29K 2105/0064* (2013.01); *B29L 2031/52* (2013.01)

(58) Field of Classification Search
CPC ......... C08L 21/02; C08C 1/15; A01K 15/026; A01K 15/025; A01K 15/02; B29K 2105/0064; B29K 2007/00; B29L 2031/52

See application file for complete search history.

(56) References Cited

U.S. PATENT DOCUMENTS

| | | | |
|---|---|---|---|
| 3,098,755 A * | 7/1963 | Barth | B05D 7/02 428/90 |
| 5,993,717 A * | 11/1999 | Leong | C08C 1/145 264/233 |
| 6,544,608 B1 * | 4/2003 | Jain | A63B 41/02 264/305 |
| 2003/0040599 A1 * | 2/2003 | Mukherjee | C08C 1/04 528/480 |
| 2006/0074180 A1 * | 4/2006 | Lipinski | B29C 33/64 524/588 |
| 2006/0235158 A1 * | 10/2006 | Ota | C08L 13/02 525/212 |
| 2010/0069183 A1 * | 3/2010 | Sandusky | A63B 45/00 473/604 |
| 2015/0111998 A1 * | 4/2015 | Kawamoto | B29B 7/90 524/37 |

\* cited by examiner

ANIMAL TOY AND METHOD OF MANUFACTURE

RELATED APPLICATIONS

The present invention claims the benefit of PCT/US17/42581, filed on Jul. 18, 2017, and contains subject matter also disclosed in U.S. patent application Ser. No. 29/571698 filed on Jul. 20, 2016, both of which are incorporated by reference as if fully rewritten herein.

BACKGROUND OF THE INVENTION

1. Field of the Invention

The present invention relates to animal fetch/chew toys, and, in particular, to a method of making animal fetch/chew toys and the products thereof.

2. Description of the Related Art

Domestic canines come in many different breed, and with each breed there are many identifiable behavior traits. With many of these breeds comes the instinct to chase, fetch and/or retrieve. Consequently, in order to stimulate a dog's instincts and mental and physical health, pet owner's acquire any of a variety of chase, fetch and retrieve toys.

The most basic is the good old fashion tennis ball. While not designed for this purpose, a tennis ball has the size and general resistance to be attractive to a dog for chasing, catching and chewing. However, because a tennis balls are not designed for pet use they tend to puncture, tear and otherwise wear or break apart. This can cause a choking hazard for the pet.

One conventional solution as a replacement for a tennis ball is provided by the The KONG® Company, LLC of Golden, Colo. The Kong Airdog Squeakair Ball is a ball having a tennis ball design but made specifically for pet use, utilizing improved, non-abrasive materials and incorporating a noise maker or "squeaker" to induce interaction and play.

Consequently, a need exists for improvements in animal fetch/chew toys and in methods for making the same.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

It is a general object of the present invention to provide a novel animal fetch/chew toy.

It is a further general object of the present invention to provide a novel method of making such animal fetch/chew toys.

It is a feature of the present invention to provide generally non-hollow, ball shaped animal fetch/chew toys that are formed of a compacted aggregate surface that provides an irregular textured surface such as to provide both a unique aesthetic as well as a unique texture.

Briefly described according to a preferred embodiment of the present invention, an animal toy is provided preferably constructed from a latex or natural rubber material and formed into a ball. The ball is formed of an aggregate of particulate material that are bound together to form a substantially non-hollow construction. The ball may be different sizes such as, for example, golf ball, baseball, or softball size, depending on the size of the animal, typically a dog, that is to use toy. In the method of making such toys, pieces of latex are joined together to form balls. The balls may be constructed by hand or, alternatively, pressed into molds. By constructing the balls by hand, no two balls, even balls of similar size, are identical. Also, because the balls are made by hand, each ball has irregular outer surface that can form a variety of resilient protuberances that can provide beneficial oral hygiene effects when chewed or rubbed against the teeth.

Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

The best mode for carrying out the invention is presented in terms of its preferred embodiment, herein depicted within the Figures.

1. Detailed Description of the Figures

Figure 7:
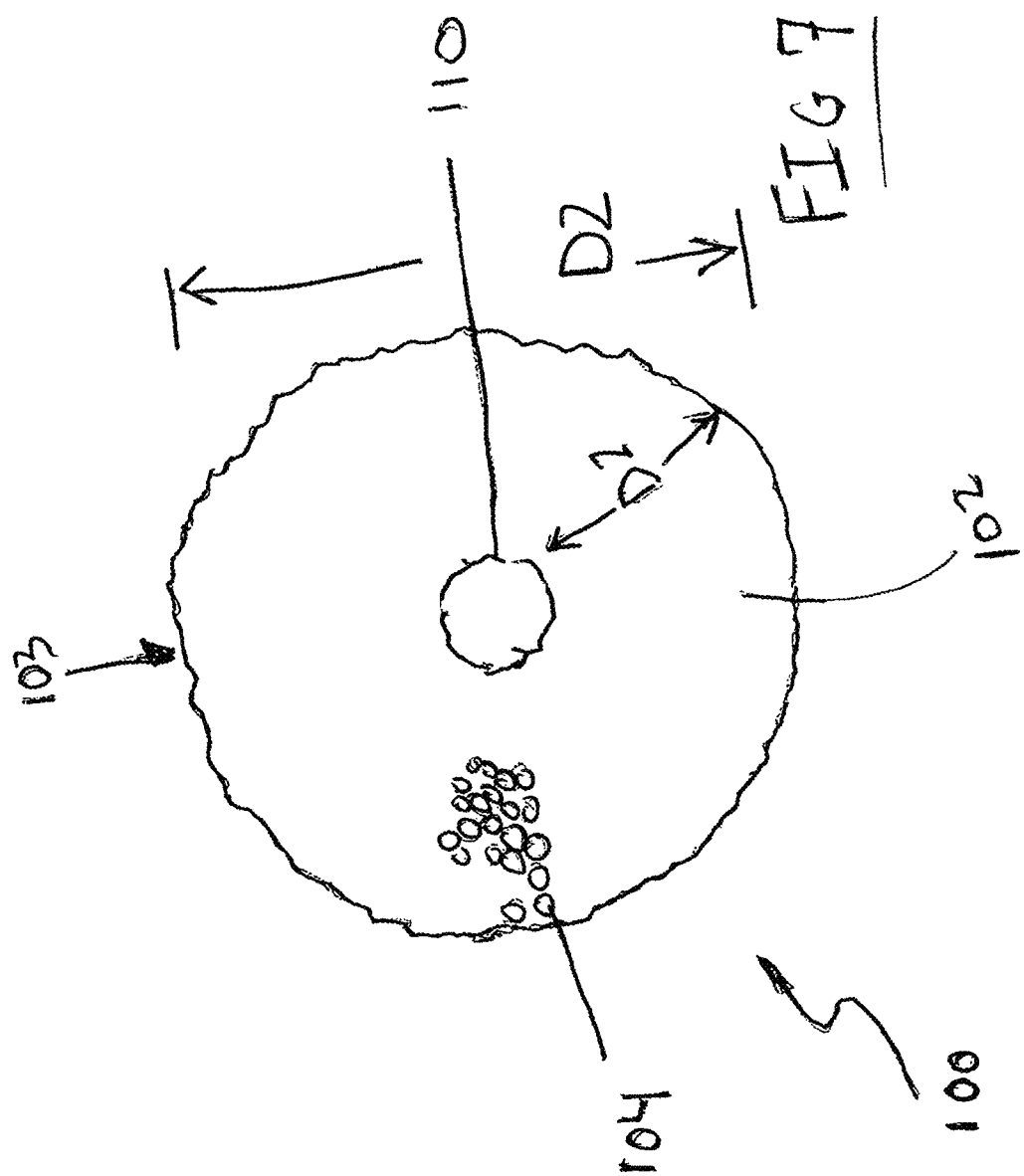
FIG. 7 is a cross sectional view taken along line XII-XII of FIG. 1.

Referring generally to FIG. 1 through FIG. 7, an animal toy, generally noted as 100, is shown according to the preferred embodiment of the present invention. The animal toy 100 is preferably constructed from a latex or natural rubber material and formed into a ball 102. The ball 102 may be formed of an aggregate of particulate material 104 that are bound together to form a substantially non-hollow construction. According to an alternate embodiment, it is envisioned that a portion of the center of the ball may form a cavity 110 (as shown in FIG. 7). However, such an alternate configuration is envisioned as being formed to facilitate an alternate manufacturing method, such as rotational molding or the like, but in any configuration it is desired that the ball 102 have a substantially filled internal section 106 that is substantially greater than any cavity 110. By way of example, and not meant as a limitation, an internal cavity 110 having a diameter of D1 which should be no greater than half the overall diameter D2 of the entire ball 102.

Figure 9:
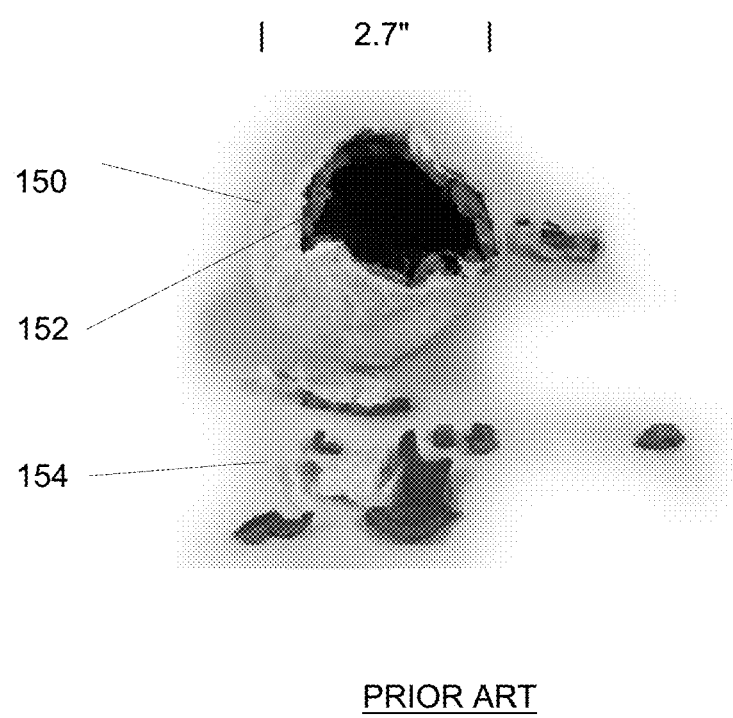
FIG. 9 is a photograph showing an otherwise conventional tennis ball 150 according to the PRIOR ART, depicted in a damaged condition as the result of animal interaction.

The ball 102 may be different sizes such as, for example, golf ball, baseball, or softball size, depending on the size of the animal, typically a dog, that is to use toy. In available commercial embodiments as provided under the WUNDERBALL™ brand available under authority through Wacky Walk'r of Hatfield, Pa., the balls 102 are formed to accommodate various sized dogs, including small dogs (1-20 pound) that has an approximate general diameter D2 of 1.5 inches, medium dogs (21-60 pounds) that has an approximate general diameter D2 of 2.35 inches, or large dogs (61-200 pounds) having an approximate general diameter D2 of 2.9 inches. For purposes of comparison, a conventional standard tennis ball 150 as shown in FIG. 9 has an outer diameter of 2.7 inches.

The toy 100 may be of various colors through the addition of pigment or dye or through the use of pre-colored rubber aggregate 104.

Figure 1:
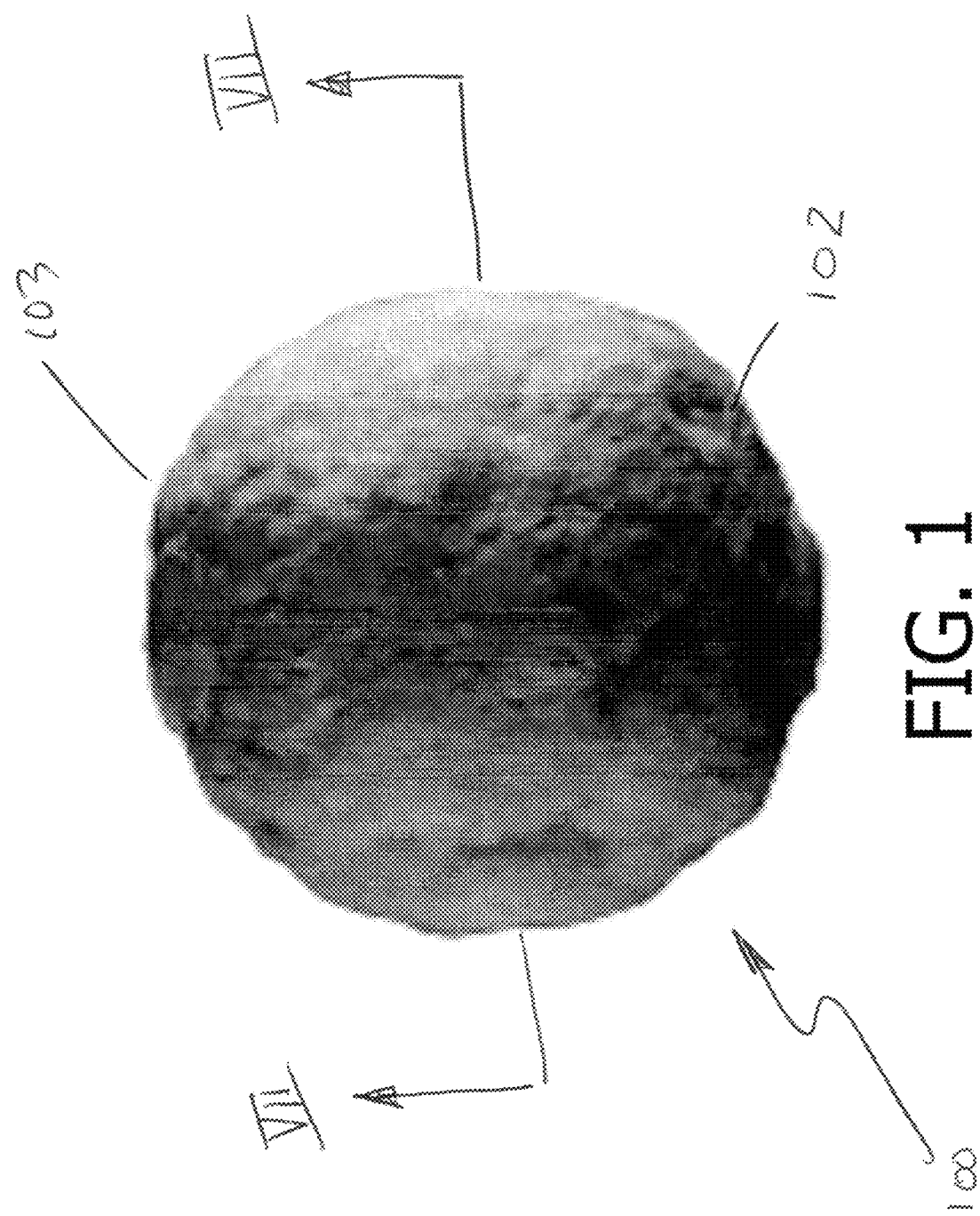
FIG. 1 is a front elevational view of an animal toy according to a preferred embodiment of the present invention.
Figure 2:
FIG. 2 is a left side elevational thereof.
Figure 3:
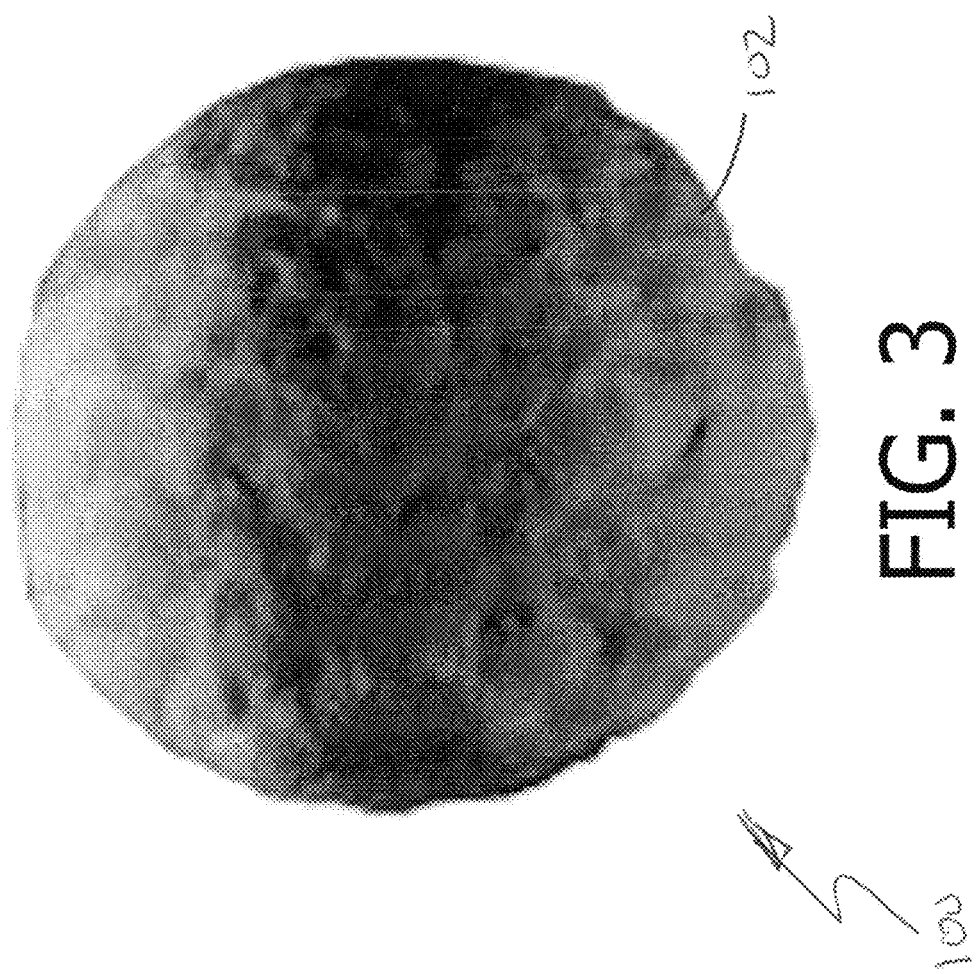
FIG. 3 is a rear elevational view thereof.
Figure 4:
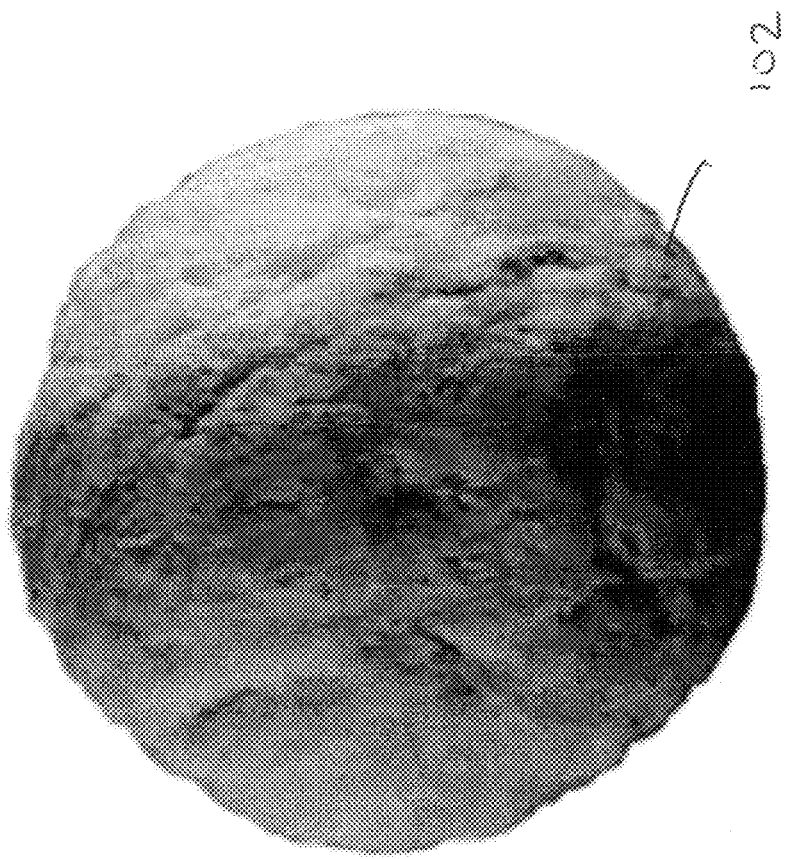
FIG. 4 is a right side elevational view thereof.
Figure 5:
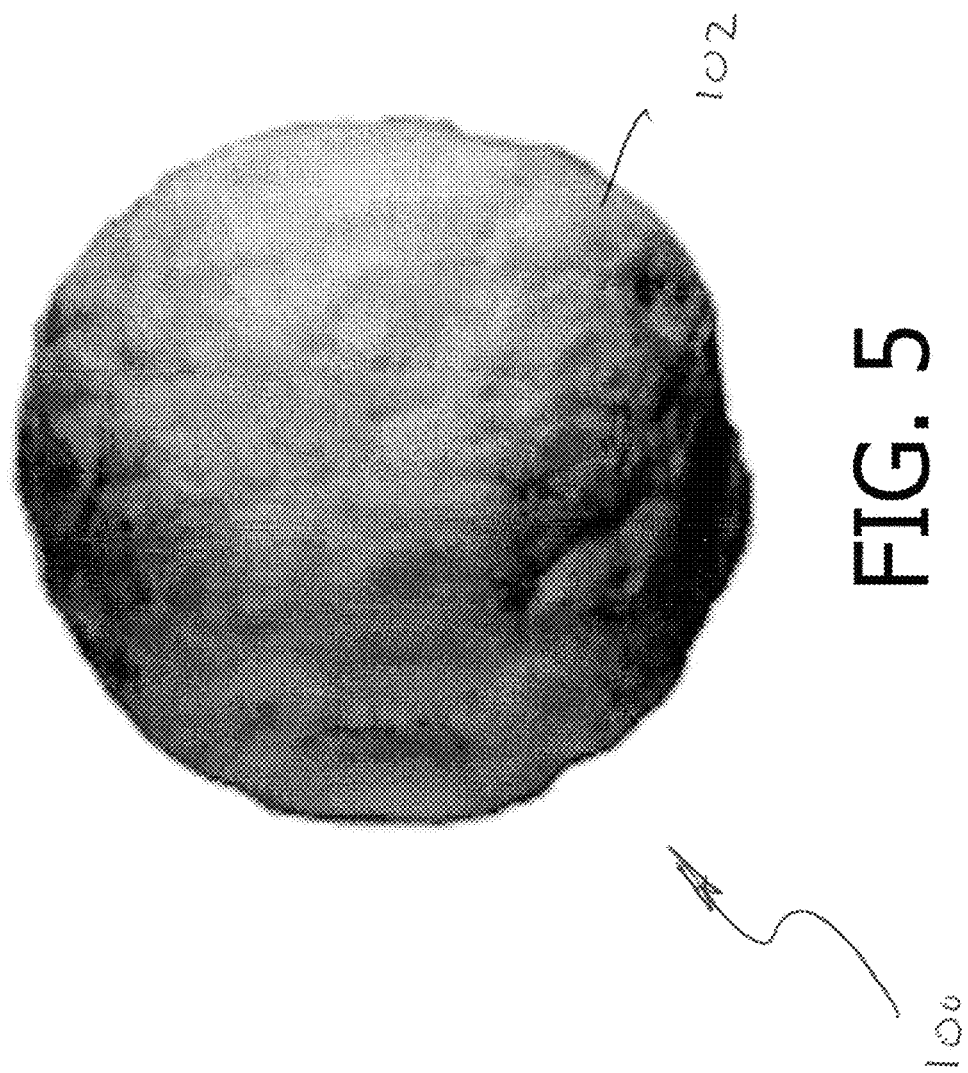
FIG. 5 is a top plan view thereof.
Figure 6:
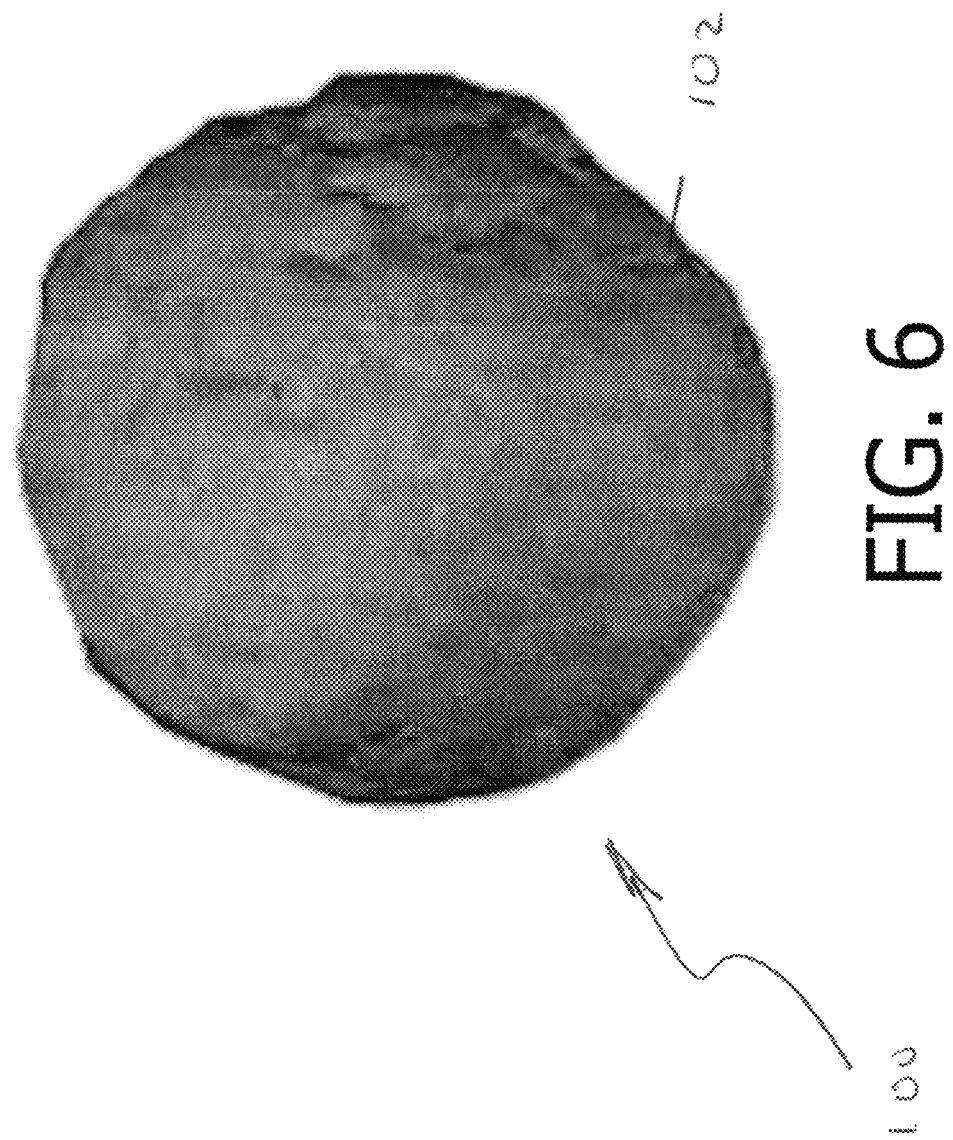
FIG. 6 is a bottom plan view thereof.
Figure 8:
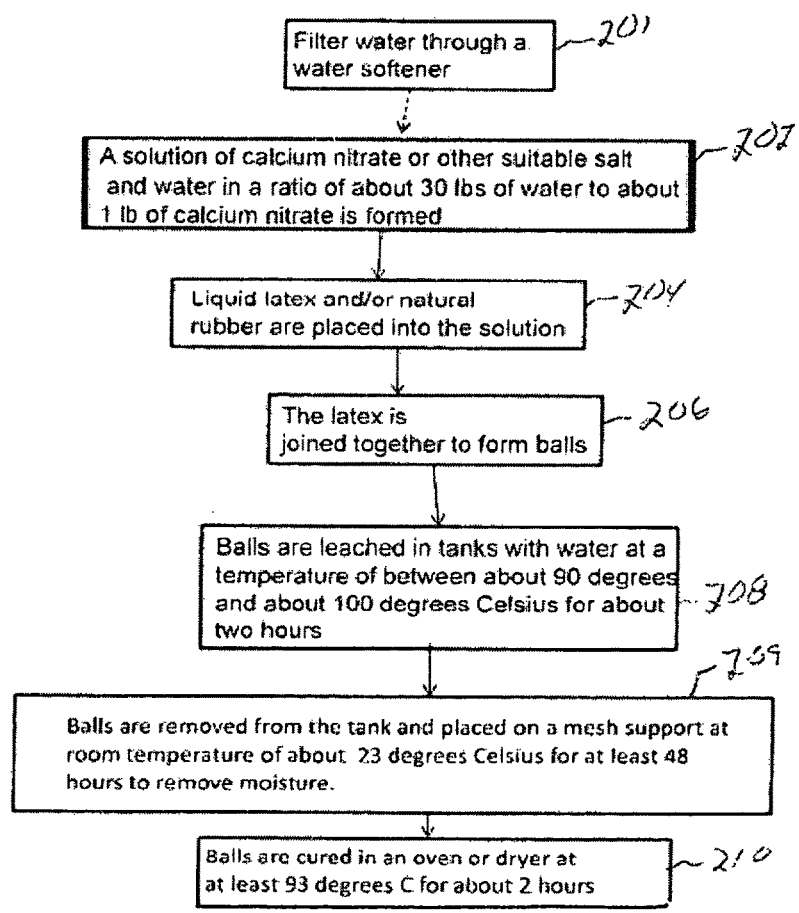
FIG. 8 is a flowchart showing an exemplary method for manufacturing the ball of FIG. 1 through FIG. 6.

Referring now in conjunction with FIG. 8, a flowchart 200 is providing depicting an exemplary method for manufacturing the animal toy 100. In FIG. 2, in step 202, a solution of calcium nitrate or other suitable salt and water in a ratio of about 30 lbs (about 13.6 kg) of water to about 1 lb (about 0.45 kg) of calcium nitrate is formed. It should be apparent to one having ordinary skill in the relevant art, in light of the present teachings, that other chemical salts that are functionally similar to or equivalent with calcium nitrate within the present method may be substituted. In step 204, liquid latex and/or natural rubber is placed into the solution. Optionally, in step 201, it is desired that, prior to adding the calcium nitrate to the water, the water is filtered through a water softener.

While in the solution, in step 206, the pieces of latex are joined together to form balls 102. The balls 102 can be constructed by hand or, alternatively, pressed into molds. By constructing the balls 102 by hand, no two balls 102, even balls 102 of similar size, are identical. Also, because the balls 102 are made by hand, each ball has irregular surfaces 103.

It has been found that, depending on the size of the balls 102, about 80-100 balls 102 can be formed using the solution of about 30 lbs of water to about 1 lb of calcium nitrate as described above.

In step 208, the newly formed balls 102 are leached in tanks with water at a temperature of between about 85 degrees and about 100 degrees Celsius for about two hours. In step 209, the balls 102 are then removed from the tank and placed on a mesh support at room temperature of about 72 degrees Fahrenheit (about 23 degrees Celsius) for at least 48 hours to remove moisture.

In step 210, balls 102 are cured in an oven or dryer at a temperature of at least 200 degrees Fahrenheit (about 93 degrees Celsius) for about 2 hours, or until the internal temperature of balls 102 reaches about 180 degrees Fahrenheit (about 83 degrees Celsius), at which temperature the latex bonds solidify balls 102.

After the balls 102 are dry, the balls 102 can be packed and shipped. The balls 102 can be used as an animal chew toy and can clean the animal's teeth. Also, because of its latex/rubber nature, balls 102 can bounce and, because of their irregular surfaces 103, when the balls 102 bounce, the balls 102 do so erratically, allowing the animal to chase the balls 102 in different directions, allowing ball 100 to be treated as a fetch toy.

2. Operation of the Preferred Embodiment

In operations, the toy 100 has an application as an animal fetch/chew toy. Used as an alternative to an otherwise conventional tennis ball 150 as shown in conjunction with FIG. 9, the toy 100 is more durable and, in the event that particulates are released they would be of a size, shape and consistency that is nonhazardous to an animal. This is in contrast to a conventional tennis ball 150, in which the narrow sidewall 152 can tear and degrade into larger, irregularly shaped shards 154 that can be a choking hazard to a pet.

It should be apparent to those skilled in the art, in light of the present teachings, that such a toy 100 can also be used by humans as a throw/catch toy as well.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical*, 520 US 17 (1997) or *Festo Corp.* v. *Shoketsu Kinzoku Kogyo Kabushiki Co.*, 535 U.S. 722 (2002), or other similar case law or subsequent precedent should not be made if any future claims are added or amended subsequent to this Patent Application.

What is claimed is:

1. A method for manufacturing an animal toy comprising the steps:

a. forming a solution of a calcium nitrate salt and water in a ratio of about 1:30 by weight;

b. placing a liquid latex and/or natural rubber into said solution such as to coalesce the latex/rubber into a plurality of individual pieces;

c. while in the solution, forming said plurality of individual pieces to join together to form and an animal toy shape;

d. leaching said solution from said animal toy shape with water at a temperature of between about 85 degrees and about 100 degrees Celsius for about two hours;

e. cooling and drying said animal toy shape to room temperature and a lower humidity; and f. curing the cooled and dried said animal toy shape in an oven or dryer until an internal temperature of the animal toy shape reaches about 180 degrees Fahrenheit.

2. The method of claim 1, wherein said animal toy shape is a ball.

3. The method of claim 1, further comprising filtering or softening said water prior to forming the solution.

4. The method of claim 1, wherein said forming said plurality of individual pieces to join together is accomplished at least in part as a manual hand operation.

5. The method of claim 2, wherein said forming said plurality of individual pieces to join together is accomplished at least in part as a manual hand operation.

6. The method of claim 3, wherein said forming said plurality of individual pieces to join together is accomplished at least in part as a manual hand operation.

7. The method of claim 1, wherein said forming said plurality of individual pieces to join together is accomplished at least in part by said piece being pressed into at least one mold.

8. The method of claim 2, wherein said forming said plurality of individual pieces to join together is accomplished at least in part by said piece being pressed into at least one mold.

9. The method of claim 3, wherein said forming said plurality of individual pieces to join together is accomplished at least in part by said piece being pressed into at least one mold.

10. The method of claim 1, wherein said cooling and drying occurs over a period of approximately at least 48 hours.

11. The method of claim 1, wherein said curing said animal toy shape in an oven or dryer occurs at a temperature of at least 200 degrees Fahrenheit for about 2 hours.

* * * * *